E. C. UNDERWOOD.
Weather-Strip.

No. 160,555

Patented March 9, 1875.

Witnesses:
H. E. Metcalf
Geo. G. Shaw.

Inventor:
Erastus C. Underwood
Per C. A. Shaw,
Atty.

United States Patent Office.

ERASTUS C. UNDERWOOD, OF BOSTON, MASSACHUSETTS.

IMPROVEMENT IN WEATHER-STRIPS.

Specification forming part of Letters Patent No. 160,555, dated March 9, 1875; application filed January 22, 1875.

*To all whom it may concern:*

Be it known that I, ERASTUS C. UNDERWOOD, of Boston, in the county of Suffolk, State of Massachusetts, have invented a certain new and useful Improvement in Weather-Strips, of which the following is a description sufficiently full, clear, and exact to enable any person skilled in the art or science to which my invention appertains to make and use the same, reference being had to the accompanying drawing, forming a part of this specification, in which—

Figure 1:
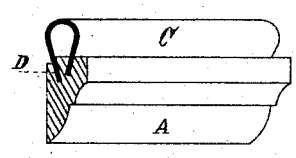
Figure 2:
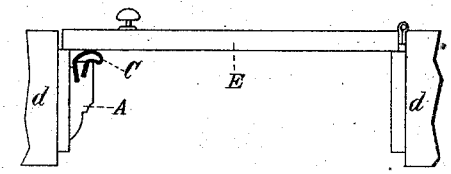
Figure 3:
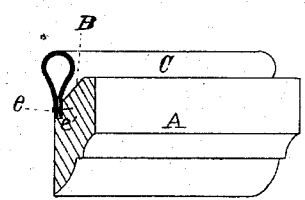

Figure 1 is an isometrical perspective view, showing a section of the ordinary weather-strip when not in use; Fig. 2, a lateral sectional view, showing the same in use; Fig. 3, a view of my improved strip when not in use, and Fig. 4 a view of the same in use.

Like letters of reference indicate corresponding parts in the different figures of the drawing.

My invention relates more especially to that class of weather-strips which are composed in part of rubber tubing or strips of rubber arranged in tubular form; and consists in a novel construction and arrangement of the parts, as hereinafter more fully set forth and claimed, by which a simpler, cheaper, and more effective device of this character is produced than is now in ordinary use.

In common weather-strips of this character the rubber is usually bent as shown in Fig. 1, being secured in the molding by having its edges cemented into separate grooves formed in the wide edge of the same, as shown at D, the rubber being represented by the letter C, and the molding by the letter A.

I have found, however, that in the use of a molding constructed in this manner it will not close or tighten the door properly, bending outwardly, as shown at C in Fig. 2, and not completely and perfectly filling the space between the door-casing $d$, door E, and molding A.

Figure 4:
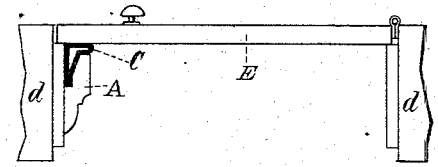

My improvement is designed to obviate this difficulty and objection; and to that end I construct and arrange the parts as shown in Fig. 3, in which A is the molding, having the inclined edge B, near the lower side of which there is a rabbet or step, in which both edges of the rubber C are joined side by side, and secured firmly to the offset $e'$ in the molding by the tacks $e$. This form of construction causes the rubber to wedge between the incline B and the casing $d$ when the door is shut, the incline forcing the rubber against the casing, and into the space between the door, the casing, and the molding, and completely closing the joint, as shown in Fig. 4.

Having thus described my invention, what I claim is—

The weather-strips described, the same consisting of the molding A, provided with the incline B, and the vibrating doubled strips of rubber C attached thereto by placing both edges together in the offset $e'$, substantially as and for the purpose specified.

ERASTUS C. UNDERWOOD.

Witnesses:
   H. E. METCALF,
   GEO. G. SHAW.